United States Patent [19]

Wamprecht et al.

[11] Patent Number: 5,268,428

[45] Date of Patent: Dec. 7, 1993

[54] BINDER COMPOSITIONS AND THEIR USE IN COATING COMPOSITIONS AND SEALING COMPOSITIONS

[75] Inventors: Christian Wamprecht, Neuss; Harald Blum, Wachtendonk; Josef Pedain, Cologne, all of Fed. Rep. of Germany

[73] Assignee: Bayer Aktiengesellschaft, Leverkusen, Fed. Rep. of Germany

[21] Appl. No.: 748,297

[22] Filed: Aug. 21, 1991

[30] Foreign Application Priority Data

Aug. 31, 1990 [DE] Fed. Rep. of Germany ....... 4027609

[51] Int. Cl.$^5$ .................. C08L 63/00; C08L 33/08; C08F 8/14
[52] U.S. Cl. .................................... 525/207; 525/74; 525/94; 525/108; 525/117; 525/118; 525/119; 525/208; 525/221; 523/400; 523/437; 523/439
[58] Field of Search ............... 525/207, 208, 221, 108, 525/117, 118, 119, 74, 94, 108; 523/400, 437, 439

[56] References Cited

U.S. PATENT DOCUMENTS

| | | | |
|---|---|---|---|
| 3,531,547 | 9/1970 | Hazen | 528/366 |
| 4,128,521 | 12/1978 | Kroker et al. | 260/31.4 R |
| 4,190,569 | 2/1980 | Kroker et al. | 260/31.6 |
| 4,452,948 | 6/1984 | Marrion et al. | 525/207 |
| 4,710,543 | 12/1987 | Chattha et al. | 525/161 |
| 4,713,427 | 12/1987 | Chattha et al. | 525/510 |
| 4,904,740 | 2/1990 | Blum et al. | 525/327 |
| 5,214,104 | 5/1993 | Wamprecht et al. | 525/207 |

FOREIGN PATENT DOCUMENTS

| | | |
|---|---|---|
| 316874 | 5/1989 | European Pat. Off. |
| 358306 | 3/1990 | European Pat. Off. |
| 1583316 | 1/1981 | United Kingdom |
| 2148900 | 6/1985 | United Kingdom |
| 8400771 | 3/1984 | World Int. Prop. O. |

OTHER PUBLICATIONS

CA 115 (2):10972a.
CA 76(8):34933r.
CA 114 (24):23077e.
CA 114 (16):145573w.
CA 113 (2):8118s.
CA 112 (26):236953v.
CA 112 (16):141429q.
CA 112 (10):79535r.
CA 111 (20):176301y.

*Primary Examiner*—JOhn Kight, III
*Assistant Examiner*—P. Hampton-Hightower
*Attorney, Agent, or Firm*—Joseph C. Gil; Thomas W. Roy

[57] ABSTRACT

The present invention relates to binder compositions containing

A) 10 to 99 parts by weight of a copolymer component containing at least one copolymer prepared from olefinically unsaturated compositions having a weight average molecular weight of 1,500 to 75,000 and having in chemically bound form both
  (i) 1 to 30% by weight of cyclic carboxylic anhydride groups (calculated as $C_4H_2O_3$) and
  (ii) 1 to 29% by weight of epoxide groups (calculated as $C_2H_3O$) and B) 1 to 90 parts by weight of a hydroxyl component containing at least one organic polyol having at least two hydroxyl groups per molecule, provided that for every anhydride group of component A) there are 0.1 to 10 hydroxyl groups of component B).

The present invention also relates to the use of these binder compositions as binders for heat-curing coating compositions or sealing compositions optionally containing paint auxiliaries and additives or as binders for room-temperature-curing sealing or coating compositions containing catalysts and, optionally, other paint auxiliaries and additives.

15 Claims, No Drawings

BINDER COMPOSITIONS AND THEIR USE IN COATING COMPOSITIONS AND SEALING COMPOSITIONS

BACKGROUND OF THE INVENTION

1. Field of the Invention

The present invention relates to new binder compositions based on copolymers having carboxylic anhydride and epoxide groups and organic compounds having at least two hydroxyl groups per molecule and to their use in coating compositions and sealing compositions.

2. Description of the Prior Art

The use of two-component compositions based on organic compounds having at least two intramolecular carboxylic anhydride groups per molecule and polyhydroxyl compounds as binders for paints and coating compositions is known.

FR-A-2,393,092 describes coating compositions based on hydroxy-functional polymers and an ester anhydride having at least two anhydride groups per molecule, the ester anhydride being a derivative of trimellitic anhydride.

EP-A-48,128 describes coating compositions based on a hydroxyl component having at least two hydroxyl groups per too molecule, an anhydride component having at least two anhydride groups per molecule and, optionally, an amine component acting as catalyst. The disadvantage of these systems is that their solvent resistance is inadequate for high-quality paints.

Binder compositions based on binder components having carboxyl groups and epoxide groups, which may be cured both at room temperature and also under stoving conditions, are already known. Thus, DE-A-2,635,177 and DE-A-2,728,459 describe low-solvent stoving enamels containing a polyacrylate having carboxyl groups, an epoxy resin having at least two epoxide groups per molecule and a solvent mixture. The disadvantage of these systems is the preliminary reaction between the free carboxyl groups and free epoxide groups which can lead to an inadequate pot life of the paints.

International patent application, No. WO 84/00768, describes heat-curing coating compositions based on a polyacrylate containing epoxide and hydroxyl groups, a special dicarboxylic anhydride and an amine resin crosslinker. However, the anhydride component, which acts as a curing agent, contains only one carboxylic anhydride group per molecule. In addition, the systems have to be cured in the presence of hardening catalysts at high temperatures (approx. 130° C). International patent applications, Nos. WO 84/00770 and WO 84/00771, describe comparable systems with the difference that the first component contains only hydroxyl groups and a separate component containing epoxide groups is additionally present.

The use of three-component systems based on organic compounds having at least two intramolecular carboxylic anhydride groups per molecule, polyhydroxyl compounds and polyepoxide compounds as binders for paints and coating compositions is also known (EP-A-134,691, EP-A-316,874 and EP-A-358,306). These three-component systems are superior to the above-cited two-component systems in regard to the solvent resistance of the paint films, but have the disadvantage that all three components must be completely compatible with one another to guarantee a good optical appearance of the paint film. This limits the range of variation of the individual components to a considerable extent.

EP-A-319,864 describes binder compositions based on a copolymer component containing incorporated carboxylic anhydride and incorporated epoxide groups and a polyamine component containing blocked amino groups. This reference does not teach or suggest the presence of a component containing hydroxyl groups.

Accordingly, an object of the present invention is to provide new binder compositions which
1) cure through addition reactions which take place between carboxylic anhydride, hydroxyl and epoxide groups,
2) have an adequate pot life for paint applications, 3) depending on the particular application can be cured at room temperature or at elevated temperature to form clear, colorless, yellowing-resistant and solvent-resistant coatings and
4) do not have any of the disadvantages of the previously described systems.

This object may be achieved in accordance with the binder compositions of the present invention as described in detail hereinafter.

The binder compositions according to the invention contain a component A) having both cyclic carboxylic anhydride groups and also free epoxide groups in chemically bound form, and a component B) having at least two free hydroxyl groups per molecule. These binder compositions have never been described before. The particular advantage of these systems is that the reactive groups are present in the form of carboxylic anhydride, epoxide and hydroxyl groups in only two components A) and B) and that component A) does not initially contain the free carboxyl groups which are necessary for crosslinking the epoxide groups of component A). Instead these carboxyl groups are only formed from the reaction of the carboxylic anhydride groups with the hydroxyl groups of component B) by the action of catalysts or heat.

Accordingly, these binder compositions show considerably better storage stability at room temperature than comparable prior art systems which contain free carboxyl groups. Another advantage of the binder compositions according to the invention is that the crosslinking reaction is based on a so-called "double-cure" mechanism, i.e., the hydroxyl groups of component B) initially react with the anhydride groups of component A) with opening of the anhydride ring and formation of carboxyl groups. This reaction is itself a crosslinking reaction. In addition, however, the newly formed carboxyl groups can react with the epoxide groups of component A) which results in additional crosslinking.

By virtue of the high crosslink densities which may be obtained, coatings characterized by very high resistance to chemicals and solvents are obtained from the binder compositions according to the invention.

SUMMARY OF THE INVENTION

The present invention relates to binder compositions containing
A) 10 to 99 parts by weight of a copolymer component containing at least one copolymer prepared from olefinically unsaturated compositions having a weight average molecular weight of 1,500 to 75,000 and having in chemically bound form both
(i) 1 to 30% by weight of cyclic carboxylic anhydride groups (calculated as $C_4H_2O_3$) and (ii) 1 to 29% by weight of epoxide groups (calculated as $C_2H_3O$) and B) 1 to 90 parts by weight of a hydroxyl component containing at least one organic polyol having at least two hydroxyl groups per molecule, provided that for every anhydride group of component A) there are 0.1 to 10 hydroxyl groups of component B).

The present invention also relates to the use of these binder compositions as binders for heat-curing coating compositions or sealing compositions optionally containing paint auxiliaries and additives or as binders for room-temperature-curing sealing or coating compositions containing catalysts and, optionally, other paint auxiliaries and additives.

DETAILED DESCRIPTION OF THE INVENTION

Copolymer component A) contains at least one copolymer having both cyclic carboxylic anhydride groups in a quantity of to 30% by weight, preferably 5 to 25% by weight, and also chemically incorporated epoxide groups in a quantity of 1 to 29% by weight, preferably 5 to 15% by weight. The copolymers have a weight average molecular weight (Mw, as determined by gel pemeation chromatography using polystyrene as standard) of 1,500 to 75,000, preferably 2,000 to 60,000 and more preferably 3,000 to 40,000.

The copolymers are preferably prepared from mono-olefinically unsaturated monomers. Three groups of olefinically unsaturated monomers are used for the preparation of the copolymers, i.e., a) olefinically unsaturated monomers containing anhydride groups,, b) olefinically unsaturated monomers containing epoxide groups and c) non-functional, olefinically unsaturated monomers free from anhydride and epoxide groups.

Monomers a) are generally used in a quantity of 1 to 30 parts by weight, preferably 5 to 25 parts by weight; monomers b) are generally used in a quantity of 3 to 96 parts by weight, preferably 16 to 50 parts by weight and monomers c) are used in a quantity of 0 to 96 parts by weight and preferably 25 to 79 parts by weight, provided that the sum of the parts by weight of a) to c) is 100. The percentage contents of the individual monomers in the mixture to be copolymerized are selected such that the above-mentioned quantities of chemically incorporated anhydride and epoxide groups are present in the copolymers. The content of these groups in the copolymers corresponds to the content of the same groups in the monomer mixture because it may be assumed that the copolymers correspond in their chemical composition to the chemical composition of the monomer mixture.

Monomers a) are monoolefinically unsaturated carboxylic anhydrides, such as for example maleic anhydride or itaconic anhydride. Maleic anhydride is preferred.

Examples of monomers b) include glycidyl acrylate, glycidyl methacrylate or allyl glycidyl ether; the first two are preferred.

Monomers c) have a molecular weight of 86 to 400 and are the known non-functional, preferably monoolefinically unsaturated monomers which are free from anhydride and epoxide groups and described in the processes known from the prior art cited above. Examples include esters of acrylic and methacrylic acid such as methyl acrylate, ethyl acrylate, n-butyl acrylate, isobutyl acrylate, tert. butyl acrylate, 2-ethylhexyl acrylate, cyclohexyl methacrylate, methyl methacrylate, n-butyl methacrylate, isobutyl methacrylate and 2-ethylhexyl methacrylate; aromatic vinyl compounds such as styrene, vinyl toluene, α-methyl styrene, α-ethyl styrene and nucleus-substituted diethyl styrenes, isopropyl styrenes, butyl styrenes and methoxy styrenes optionally representing isomer mixtures; vinyl ethers such as ethyl vinyl ether, n-propyl vinyl ether, isopropyl vinyl ether, n-butyl vinyl ether and isobutyl vinyl ether; vinyl esters such as vinyl acetate, vinyl propionate and vinyl butyrate.

Mixtures of monomers a) to c) may be used for carrying out the copolymerization reaction.

The copolymers may be prepared by the copolymerization of monomers a) to c) using known radical polymerization processes, such as bulk or solution polymerization. In these processes, the monomers are generally copolymerized at temperatures of 60 to 180° C., preferably 80° to 160° C. in the presence of radical formers and, optionally, molecular weight regulators.

The copolymerization is preferably carried out in inert solvents. Suitable solvents include aromatic hydrocarbons such as benzene, toluene and xylene; esters such as ethyl acetate, butyl acetate, hexyl acetate, heptyl acetate, methyl glycol acetate, ethyl glycol acetate and methoxypropyl acetate; ethers such as tetrahydrofuran, dioxane and diethylene glycol dimethyl ether; and ketones such as acetone, methyl ethyl ketone, methyl isobutyl ketone, methyl-n-amyl ketone and methyl isoamyl ketone.

The copolymerization may be carried out continuously or discontinuously. Preferably, the monomer mixture and the initiator are uniformly and continuously introduced into a polymerization reactor and, at the same time, the corresponding quantity of polymer is continuously removed.

Substantially chemically uniform copolymers may advantageously be produced in this way. Substantially chemically uniform copolymers may also be obtained by introducing the reaction mixture at a constant rate into a stirred tank reactor without removing the polymer.

It is also possible to initially introduce a portion of the monomers, for example in solvents of the type mentioned, and then to add the remaining monomers and auxiliaries either separately or together at the reaction temperature.

The polymerization reaction preferably takes place at atmospheric pressure, although pressures of up to 20 bar may be applied. The initiators are used in quantities of 0.05 to 15% by weight, based on the total quantity of monomers.

Suitable initiators are known and include aliphatic azo compounds such as azodiisobutyronitrile, azo-bis-2-methyl valeronitrile, 1,1'-azo-bis-l-cyclohexane nitrile and 2,2'-azo-bis-isobutyric acid alkyl ester; symmetrical diacyl peroxides such as acetyl, propionyl or butyryl peroxide and benzoyl peroxides substituted by bromine, nitro, methyl or methoxy groups; symmetrical peroxydicarbonates such as diethyl, diisopropyl, dicyclohexyl and dibenzoyl peroxydicarbonate; tert. butyl peroxy-2-ethyl hexanoate; tert. butyl perbenzoate; hydroperoxides such as tert. butyl hydroperoxide and cumene hydroperoxide; and dialkyl peroxides such as dicumyl peroxide, tert. butyl cumyl peroxide and di-tert. butyl peroxide.

To regulate the molecular weight of the copolymers, known regulators may be used during their production such as tert. dodecyl mercaptan, n-dodecyl mercaptan and diisopropyl xanthogene disulfide. The regulators may be added in quantities of 0.1 to 10% by weight, based on the total quantity of monomers.

The solutions of the copolymers which accumulate during the copolymerization reaction may be used without further working up for the production of the binder compositions according to the invention.

Polyhydroxyl component B) is based on compounds containing at least two hydroxyl groups per molecule. Examples are low molecular weight aliphatic, cycloaliphatic or araliphatic polyols having a molecular weight of 62 to 500, preferably of 62 to 261, and containing 2 to 6, preferably 2 to 4 hydroxyl groups per molecule.

However, polyhydroxyl component B) also includes relatively high molecular weight polyols having a molecular weight of 500 to 75,000, preferably 600 to 50,000, and an OH number of 20 to 700. preferably 25 to 650.

Mixtures of low molecular weight and relatively high molecular weight compositions may also be used.

Suitable low molecular weight polyhydroxyl compounds include ethylene glycol; the isomeric propanediols, butanediols and hexanediols; neopentyl glycol; cyclohexane-1,4-diol; cyclohexane dimethanol; bis-hydroxymethyl hexahydro-4,7-methanoindane; N,N',N''-tris-(2-hydroxyethyl)-isocyanurate; polyglycols such as diethylene glycol, triethylene glycol, tripropylene glycol and polypropylene glycols; alkanetriols such as trimethylol propane and glycerol; alkyl tetraols such as pentaerythritol; reaction products of the above-mentioned hydroxyl compositions with c-caprolactone; and hydroxy-functional polyesters and hydroxyfunctional polyethers provided that they have a maximum molecular weight of 500. The relatively high molecular weight polyhydroxyl compounds include the hydroxyl-containing polyether or polyester polyols known from polyurethane chemistry which have a molecular weight, which may be calculated from the hydroxyl group content and hydroxyl functionality, of 500 to 10,000, preferably 1,000 to 7,000. Preferred relatively high molecular weight polyhydroxyl compounds are hydroxyfunctional copolymers having a molecular weight of 500 to 75,000, preferably 600 to 50,000. These copolymers may be obtained by the copolymerizing hydroxyfunctional monomers with monomers c) which have been previously described. Suitable hydroxyfunctional monomers include hydroxyalkyl acrylates and methacrylates such as 2-hydroxyethyl, 2-hydroxypropyl, 1-methyl-2-hydroxyethyl and/or 4-hydroxybutyl acrylate or methacrylate.

The individual components A) and B) are generally used in quantities such that for every anhydride group of component A) there are 0.1 to 10, preferably 0.5 to 5 and more preferably 0.8 to 1.5 hydroxyl groups of component B).

The binder compositions according to the invention are valuable binders for coating compositions or sealing compositions. Because the cyclic carboxylic anhydride groups react with the hydroxyl groups under the effect of heat and the carboxylic acid groups formed during this reaction react with epoxide groups, the binder compositions according to the invention are suitable without further additives as binders for heat-curing coating compositions or sealing compositions. These compositions may be cured, for example, over a period of about 10 to 60 minutes at temperatures of 120 to 200° C. Since no free carboxyl groups are initially present in the binder compositions, they have a very long storage life at room temperature. After the addition of suitable catalysts, however, they may also be used as binders for coating compositions and sealing compositions which cure at room temperature.

This requires a catalyst component C) which increases the reactivity of the anhydride groups to the hydroxyl groups to such an extent that a crosslinking reaction begins even at low temperatures, for example, at room temperature. Such catalysts include compositions containing tertiary amino groups. They may be compositions which are either inert to anhydride or epoxide groups or, in addition to the tertiary amino group, contain a group which reacts with anhydride or epoxide groups (e.g., a hydroxyl group or a primary or secondary amino group). If the reactive group is a hydroxyl group, a primary or secondary amino group, the catalyst component C) is chemically incorporated into binder component A) by reaction of its reactive group with an epoxide and/or anhydride group to form a secondary or tertiary amino group, accompanied by the formation of an additional hydroxyl group (from the epoxide group) or semiester and/or semiamide structures (from the anhydride group).

Suitable catalysts C) include tertiary amines having a molecular weight of 73 to 300 such as ethyl dimethyl amine, diethyl methyl amine, triethyl amine, ethyl diisopropyl amine, tributyl amine, 1-methyl pyrrolidine, 1-methyl piperidine, 1,4-dimethyl piperazine, 1,4-diazabicyclo[2.2.2]octane and 1,8-diazabicyclo[5.4.0]undec-7-ene, N,N-dimethyl ethanolamine, N,N-diethyl propanolamine, N,N-dibutyl ethanolamine, 1-amino-3-(diethylamino)-propane or 1-amino-2-(diethylamino)-ethane. Mixtures of these tertiary amines may also be used.

Organic compounds containing at least one tertiary amino group which have a molecular weight of more than 300 may also be used. Such compounds include reaction products of olefinically unsaturated compounds containing acrylate or methacrylate groups with secondary amines such as the reaction product of 1 mole of trimethylol propane triacrylate and 3 moles of di-n-butyl amine. Also suitable are reaction products of polyisocyanates with N,N-dialkyl alkanolamines such as the reaction product of 1 mole of a biuretized polyisocyanate based, e.g., on hexamethylene diisocyanate, and 3 moles N,N-dimethyl ethanolamine.

Compounds containing a hydroxyl group in addition to a tertiary amino group may also be prepared, for example, by reacting compounds containing an epoxide group with secondary amines, for example, the reaction product of ethyl hexyl glycidyl ether and di-n-butyl amine.

Polyhydroxyl compositions which contain tertiary amino groups may also be used as component B). In these cases there is often no need to add an additional catalyst component C) because the incorporated tertiary amine nitrogen atoms of component B) act as incorporated catalysts for the crosslinking reaction.

Suitable polyols containing tertiary amine groups include bis-(2-hydroxyethyl)-methyl amine, bis-(2-hydroxyethyl)-butyl amine, tris-(2-hydroxyethyl)-amine, tris-2-(2-hydroxyethoxy)ethyl amine, bis-(2-hydroxypropyl)-methyl amine, trim-(2-hydroxypropyl)-amine and, preferably, reaction products thereof with c-caprolactone. Also suitable are reaction products of the higher than difunctional polyhydroxyl compounds which have previously been mentioned with monoisocyanates containing tertiary nitrogen atoms, for example, reaction products of (i) 1 mole of N,N-dimethyl ethanolamine with (ii) 1 mole of 1,6-diisocyanatohexane, 1-isocyanato-1-methyl-4(3)-isocyanatomethyl cyclohexane or isophorone diisocyanate; hydroxyfunctional copolymers containing tertiary nitrogen atoms, for example, those prepared using hydroxy-functional monomers such as 2-hydroxyethyl acrylate and amino-functional monomers such as N,N-diethylaminoethyl methacrylate; hydroxy- and epoxyfunctional polymers; polyepoxides reacted with a dialkyl amine such as dimethyl amine; reaction products of compounds containing one tertiary and at least two primary or secondary amino groups with cyclic organic carbonates in a ratio such that each primary or secondary amino group can be reacted with a carbonate group, for example, reaction products of (i) 1 mole of bis-(3-aminopropyl)-methyl amine and (ii) 2 moles of ethylene carbonate, propylene carbonate or glycerol carbonate; and alkoxylation products of primary and/or second mono- or polyamines containing at least two NH bonds such as the adduct of 4 to 5 moles of propylene oxide with 1 mole of ethylene diamine or correspondingly prepared, relatively high molecular weight aminopolyether polyols which are known and contain incorporated tertiary nitrogen atoms.

Component B) may consist of mixtures of the nitrogen-containing and nitrogen-free polyhydroxyl compounds mentioned by way of example.

In addition to compositions containing tertiary amino groups, suitable catalysts C) also include compounds containing quaternary ammonium groups such as (2-hydroxyethyl)-trimethyl ammonium chloride, tetrabutyl ammonium chloride, tetrabutyl ammonium bromide, tetraethyl ammonium bromide and tetrahexyl amonium chloride.

Tin compounds such as tin dioctoate, dibutyl tin dilaurate, dibutyl tin diacetate and dibutyl tin dichloride may also be used as catalyst component C) as well as phosphorus compounds such as triphenyl phosphine.

The coating compositions or sealing compositions containing the binder compositions according to the invention may also contain other auxiliaries and additives D) such as solvents and diluents, flow control agents, antioxidants, UV absorbers and pigments.

The coating compositions or sealing compositions are produced either by mixing starting components A) and B) and, optionally, C) and D) with one another or, depending on the application, by using only starting components A), B) and, optionally, D), as described in the following. Where solvents or diluents are used as component D), they may be added to component A) or B) or optionally component C). In one particular embodiment, the solvents or diluents are present during the preparation of components A) and B), as described for example with reference to the preparation of the copolymers.

The solvents or diluents are generally used in the quantities necessary for establishing suitable processing viscosities. The solids content of the compositions to be used in accordance with the invention is generally between 20 and 80% by weight. However, it is also possible in principle to further reduce the solvent or diluent content by using suitable low molecular weight copolymers and, particularly in the production of sealing compositions using the binder compositions according to the invention, to dispense with the use of solvents or diluents altogether.

The binder compositions according to the invention may be used directly, i.e., without further additives, for the production of clear coatings.

In general, however, the above-mentioned auxiliaries and additives D) are added. The ready-to-use systems obtained in this way may be applied as coating or sealing compositions to any, optionally pretreated, substrates such as metals, wood, glass, ceramics, stone, concrete, plastics, textiles, leather, paperboard and paper by known methods such as spray coating, spread coating, dip coating, flood coating, casting and roll coating.

In the following examples, all percentages and parts are by weight, unless otherwise indicated.

EXAMPLES

General procedure for the production of copolymers $A_1$ to
$A_6$ containing anhydride and epoxide groups and copolymers $B_1$ to $B_5$ containing hydroxyl groups Part I was introduced into a 3 liter reaction vessel equipped with a stirrer and a heating and cooling system and heated to the reaction temperature. Part II and part III were then added beginning at the same time; part II was added over a total period of 2 hours and part III was added over a total period of 2.5 hours. The reaction mixture was then stirred for 2 hours at the reaction temperature.

The reaction temperatures and compositions of parts of I to III of the copolymers A1 to A6 containing anhydride and epoxide groups are listed in Table I together with the characteristic data of the products obtained. The corresponding data for copolymers $B_1$ to $B_5$ containing hydroxyl groups is set forth in Table II.

TABLE I

| Copolymers containing anhydride and epoxide groups (quantities in g) | | | | | | |
|---|---|---|---|---|---|---|
| Copolymers | $A_1$ | $A_2$ | $A_3$ | $A_4$ | $A_5$ | $A_6$ |
| Part I | | | | | | |
| Butyl acetate | 700 | 700 | 700 | 700 | 700 | 700 |
| Part II | | | | | | |
| Ethyl acrylate | | | 234 | | | |
| n-Butylacrylate | | | | | 318 | |
| 2-Ethylhexyl acrylate | | | | | | 304 |
| Methyl methacrylate | 644 | 234 | 286 | | | |
| n-Butyl methacrylate | | 299 | | 448 | | |
| Styrene | 311 | 351 | 293 | 293 | 351 | 293 |
| Glycidyl methacrylate | 128 | 170 | 212 | 255 | 297 | 340 |
| Maleic anhydride | 88 | 117 | 146 | 175 | 205 | 234 |
| Part III | | | | | | |
| Tert. butylperoxy-2-ethyl | 70 | 70 | 70 | 70 | 70 | 70 |

TABLE I-continued

| Copolymers containing anhydride and epoxide groups (quantities in g) | | | | | | |
|---|---|---|---|---|---|---|
| Copolymers | $A_1$ | $A_2$ | $A_3$ | $A_4$ | $A_5$ | $A_6$ |
| hexanoate (70% in isododecane) | | | | | | |
| Butyl acetate | 59 | 59 | 59 | 59 | 59 | 59 |
| Polymerization temperature (°C.) | 120 | 120 | 120 | 120 | 120 | 120 |
| Solids content (%) | 60.1 | 59.8 | 60.8 | 59.9 | 59.2 | 59.4 |
| Viscosity at 23° C. (mPa.s) | 28000 | 18000 | 13000 | 9000 | 17500 | 21400 |

TABLE II

| Hydroxyfunctional copolymers (quantities in g) | | | | | |
|---|---|---|---|---|---|
| Copolymers | $B_1$ | $B_2$ | $B_3$ | $B_4$ | $B_5$ |
| Part I | | | | | |
| Butyl acetate | | | 580 | 580 | 580 |
| Xylene | 600 | 600 | | | |
| Part II | | | | | |
| n-Butyl acrylate | 254 | | 380 | | 380 |
| Methyl methacrylate | 507 | | 348 | | 279 |
| n-Butyl methacrylate | | 507 | | 433 | |
| Styrene | 291 | 470 | | 253 | |
| 2-Hydroxyethyl acrylate | | | | | 608 |
| 2-Hydroxyethyl methacrylate | | | | 581 | |
| Hydroxypropyl methacrylate* | 215 | 290 | 539 | | |
| Part III | | | | | |
| Tert. butylperoxy-2-ethyl hexanoate (70% in isododecane) | 76 | 76 | 75 | 75 | 75 |
| Butyl acetate | | | 78 | 78 | 78 |
| Xylene | 57 | 57 | | | |
| Polymerization temperature (°C.) | 125 | 125 | 125 | 125 | 125 |
| Solids content (%) | 65.2 | 65.2 | 64.6 | 64.9 | 65.9 |
| Viscosity at 23° C. (mPa.s) | 23000 | 44000 | 21100 | 106000 | 5200 |
| OH value (as supplied) | 42 | 63 | 105 | 125 | 146 |

*Technical mixture of 1-methyl-2-hydroxyethyl and 2-hydroxypropyl isomers in a ratio of 1:3.

II General procedure for the production of hydroxyfunctional polyesters $B_6$ to $B_{10}$ The reaction components were weighed into a 2 liter reaction vessel equipped with a stirrer and with a heating and cooling system and stirred at the temperature indicated for the time indicated. The conversion was determined by measurement of the solids content which should amount to about 100%.

The reaction times, reaction temperatures and reaction components are listed in Table III together with the characteristic data of the products obtained.

TABLE III

| Hydroxyfunctional polyesters (quantities in g) | | | | | |
|---|---|---|---|---|---|
| Polyester | $B_6$ | $B_7$ | $B_8$ | $B_9$ | $B_{10}$ |
| Trimethylol propane | 536 | 536 | 536 | | |
| Glycerol | | | | 368 | |
| 1,3,5-Tris-(2-hydroxyethyl) isocyanurate | | | | | 522 |
| ε-Caprolactone | 684 | 1024 | 1368 | 1368 | 684 |
| Tin dioctoate | 0.6 | 0.8 | 1.0 | 1.2 | 0.6 |
| Reaction temperature (°C.) | 150 | 150 | 150 | 150 | 150 |
| Reaction time (h) | 6 | 6 | 6 | 6 | 6 |
| Solids content (%) | 99.8 | 99.3 | 98.7 | 99.6 | 99.8 |
| Viscosity at 23° C. (mPa.s) | 2300 | 1700 | 1700 | 2150 | 1052 |
| OH value | 545 | 430 | 345 | 380 | 275 |

III Production of the coating compositions according to the invention a) Coatings hardening under stoving conditions Copolymers $A_1$ to $A_6$ were mixed with polyols $B_1$ to $B_{10}$ and the resulting mixture was, if necessary, adjusted to a processable viscosity by the addition of an organic solvent or diluent. The films were coated onto test plates at a wet film thickness of 150 μm. After airing for 5 minutes at room temperature the coated test plates were stored for 30 minutes at 125° C. and were then cooled to room temperature. Clear, colorless, crosslinked paint films having good optical and mechanical properties were obtained.

Solvent resistance was tested by rubbing with a cotton wool plug soaked with methyl isobutyl ketone (MIBK). The result of this test was calculated as the number of double rubs which the paint film withstood without visibly changing. No film was double rubbed more than 200 times.

The compositions of the binders and the solvent resistance as the degree of crosslinking are shown in Table IV below.

TABLE IV

| Application Example | 1 | 2 | 3 | 4 | 5 | 6 | 7 |
|---|---|---|---|---|---|---|---|
| Copolymer | 40.0 g $A_1$ | 40.0 g $A_2$ | 40.0 g $A_3$ | 40.0 g $A_4$ | 40.0 g $A_5$ | 40.0 g $A_6$ | 40.0 g $A_4$ |
| Polyol | 8.0 g $B_4$ | 12.8 g $B_3$ | 11.4 g $B_5$ | 16.0 g $B_4$ | 37.4 g $B_2$ | 64.0 g $B_1$ | 3.6 g $B_6$ |
| Butyl acetate | 20.0 g | 20.0 | 20.0 g | 20.0 g | 30.0 g | 30.0 g | 20.0 g |
| MIBK rubbing test: number of double rubs | 200 | 150 | 180 | 180 | 100 | 110 | 200 |

TABLE IV-continued

| Application Example | 8 | 9 | 10 | 11 |
|---|---|---|---|---|
| Copolymer | 40.0 g A$_5$ | 40.0 g A$_6$ | 40.0 g A$_5$ | 40.0 g A$_6$ |
| Polyol | 5.4 g B$_7$ | 7.6 g B$_8$ | 6.0 g B$_9$ | 9.6 g B$_{10}$ |
| Butyl acetate | 20.0 g | 20.0 g | 40.0 g | 30.0 g |
| MIBK rubbing test: number of double rubs | 180 | 160 | 200 | 100 | b) Coatings hardening at room temperature

Copolymers A$_1$ to A$_6$ were mixed with polyols B$_1$ to B$_{10}$ and a catalyst at room temperature and the resulting mixture was, if necessary, adjusted to a processable viscosity by the addition of an organic solvent or diluent. The films were applied to test plates at a wet film thickness of 150 JAM. The films thus applied at room temperature were all tack-free after 60 minutes at the longest. Clear, colorless, crosslinked films having good optical and mechanical properties were obtained after aging, i.e., drying for 24 hours at room temperature.

The paint mixtures all had pot lives of several hours. Solvent resistance was determined as described above.

The compositions of the binder compositions and the solvent resistance as the degree of crosslinking are shown in Table V below.

TABLE V

| Application Example | 12 | 13 | 14 | 15 | 16 | 17 | 18 |
|---|---|---|---|---|---|---|---|
| Copolymer | 40.0 g A$_1$ | 40.0 g A$_2$ | 40.0 g A$_3$ | 40.0 g A$_4$ | 40.0 g A$_5$ | 40.0 g A$_6$ | 40.0 g A$_4$ |
| Polyol | 8.0 g B$_4$ | 12.8 g B$_3$ | 11.4 g B$_5$ | 16.0 g B$_4$ | 37.4 g B$_2$ | 64.0 g B$_1$ | 3.6 g B$_6$ |
| N,N-dimethyl ethanolamine | | | | 0.2 g | 0.2 g | 0.2 g | |
| Triethylamine | 0.2 g | 0.2 g | 0.2 g | | | | 0.2 g |
| Butyl acetate | 20.0 g | 20.0 g | 20.0 g | 20.0 g | 20.0 g | 20.0 g | 20.0 g |
| MIBK rubbing test: number of double rubs | 200 | 140 | 170 | 200 | 100 | 100 | 120 |

| Application Example | 19 | 20 | 21 | 22 |
|---|---|---|---|---|
| Copolymer | 40.0 g A$_5$ | 40.0 g A$_6$ | 40.0 g A$_5$ | 40.0 g A$_6$ |
| Polyol | 5.4 g B$_7$ | 7.6 g B$_8$ | 6.0 g B$_9$ | 9.6 g B$_{10}$ |
| N,N-dimethyl ethanolamine | 0.2 g | 0.2 g | | 0.2 g |
| Triethylamine | | | 0.2 g | |
| Butyl acetate | 20.0 g | 20.0 g | 20.0 g | 40.0 g |
| MIBK rubbing test: number of double rubs | 90 | 100 | 100 | 160 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A binder composition which is present in an organic solvent and comprises
A) 10 to 99 parts by weight of a copolymer component comprising at least one copolymer which is prepared by the radical polymerization of olefinically unsaturated compounds, has a weight average molecular weight of 1,500 to 75,000 and contains in chemically bound form both
   i) 1 to 30% by weight of cyclic carboxylic anhydride groups (calculated as C$_4$H$_2$O$_3$) and
   1 to 29% by weight of epoxide groups (calculated as C$_2$H$_3$O) and
B) 1 to 90 parts by weight of a hydroxyl component comprising at least one organic polyol containing at least two hydroxyl groups per molecule,
provided that for every anhydride group of component A) there were 0.1 to 10 hydroxyl groups of component B).

2. The binder composition of claim 1 wherein component A) comprises the radical polymerization product of
   a) 1 to 30 parts by weight of olefinically unsaturated monomers containing anhydride groups,
   b) 3 to 96 parts by weight of olefinically unsaturated monomers containing epoxide groups and
   0 to 96 parts by weight of olefinically unsaturated monomers which are free from anyhdride and epoxide groups, provided that the sum of the parts by weight of monomers a) to c) is 100.

3. The binder composition of claim 2 wherein monomer a) comprises maleic anhydride and/or itaconic anhydride.

4. The binder composition of claim 2 wherein monomer b) comprises glycidyl acrylate, and glycidyl methacrylate and/or allyl glycidyl either 5. The binder composition of claim 3 wherein monomer b) comprises glycidyl acrylate, and glycidyl methacrylate and/or allyl glycidyl either 6. The binder composition of claim 1 wherein component B) comprises a hydroxy-functional polyacrylate copolymer.

7. The binder composition of claim 5 wherein component B) comprises a hydroxy-functional polyacrylate copolymer.

8. The binder composition of claim 1 wherein component B) comprises a hydroxy-functional polyester.

9. The binder composition of claim 5 wherein component B) comprises a hydroxy-functional polyester.

10. The binder composition of claim 1 wherein component B) comprises a hydroxy-functional polyether.

11. The binder composition of claim 5 wherein component B) comprises a hydroxy-functional polyether.

12. The binder composition of claim 1 wherein component B) comprises an organic compound having a molecular weight of 62 to 261 and containing 2 to 6 hydroxyl groups per molecule.

13. The binder composition of claim 5 wherein component B) comprises an organic compound having a molecular weight of 62 to 261 and containing 2 to 6 hydroxyl groups per molecule.

14. A room temperature curable coating or sealing composition comprising the binder composition of claim 1 and a catalyst for the reaction between carboxylic acid anhydride groups and hydroxyl groups.

15. A thermosetting coating or sealing composition comprising the binder composition of claim 1.

* * * * *